(12) United States Patent
Maloney et al.

(10) Patent No.: US 6,634,386 B1
(45) Date of Patent: Oct. 21, 2003

(54) FLUID ACCUMULATOR FOR USE IN A VEHICLE ANTI-LOCK BRAKE SYSTEM

(75) Inventors: Brian Maloney, Allen Park, MI (US); John Cassidy, Brighton, MI (US); Joseph A. Starr, Plymouth, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/969,543

(22) Filed: Oct. 2, 2001

(51) Int. Cl.[7] ................................................. F16L 55/04
(52) U.S. Cl. ..................... 138/31; 138/30; 303/DIG. 11
(58) Field of Search ................ 138/31, 30; 303/DIG. 11

(56) References Cited

U.S. PATENT DOCUMENTS

| | | | |
|---|---|---|---|
| 2,780,504 A | 2/1957 | Russell | |
| 3,224,464 A | 12/1965 | Schmiel | |
| 3,863,677 A | 2/1975 | Tarsha | |
| 4,679,994 A | 7/1987 | Brown | |
| 4,976,501 A | 12/1990 | Sivulka et al. | |
| 5,311,910 A | 5/1994 | Hasegawa et al. | |
| 5,363,744 A | 11/1994 | Pichler | |
| 5,403,077 A | 4/1995 | Burgdorf et al. | |
| 5,484,194 A | 1/1996 | Reinartz et al. | |
| 5,492,202 A | 2/1996 | Drotar et al. | |
| 5,522,651 A | * 6/1996 | Sorensen | 303/113.5 |
| 5,531,513 A | 7/1996 | Tackett | |
| 5,540,486 A | 7/1996 | Linkner | |
| 5,673,978 A | * 10/1997 | Linkner, Jr. | 303/87 |
| 5,735,314 A | * 4/1998 | Alaze et al. | 138/31 |
| 5,941,277 A | * 8/1999 | Vogel | 138/30 |
| 5,992,948 A | 11/1999 | Gowda | |
| 6,042,200 A | 3/2000 | Hosoya et al. | |
| 6,065,814 A | 5/2000 | Nishii et al. | |
| 6,145,543 A | 11/2000 | Ohishi et al. | |
| 6,213,572 B1 | * 4/2001 | Linkner, Jr. et al. | 303/155 |
| 6,254,200 B1 | * 7/2001 | Ganzel | 303/119.2 |
| 6,318,814 B1 | * 11/2001 | Burgdorf et al. | 303/113.1 |

* cited by examiner

*Primary Examiner*—James Hook
(74) *Attorney, Agent, or Firm*—MacMillan, Sobanski & Todd, LLC

(57) ABSTRACT

A hydraulic control unit (HCU) for a vehicle brake system having an HCU body and an accumulator mounted in the HCU body. A grommet is provided for mounting the HCU body to a vehicle body and resiliently separating the HCU body from the vehicle body. The grommet defines a vent path for the accumulator and includes a hollow generally cylindrical shaft. The shaft has a closed end and an open end, and the closed end has an opening therethrough. An enlarged annular head is formed on the open end of the shaft and has an inner surface defining an axial bore therethrough. The axial bore is in fluid communication with the hollow shaft, the annular head further has a crown cut geometry providing radially extending grooves within an axial face of the annular head, the radially extending grooves being in fluid communication with the axial bore of the annular head.

18 Claims, 4 Drawing Sheets

FLUID ACCUMULATOR FOR USE IN A VEHICLE ANTI-LOCK BRAKE SYSTEM

BACKGROUND OF INVENTION

The present invention relates generally to a low pressure accumulator and more particularly, to a low pressure accumulator assembly for receiving and temporarily storing fluid in a vehicle anti-lock brake system.

Braking a vehicle in a controlled manner under adverse conditions such as rain, snow, or ice generally requires precise application of the brakes by the vehicle driver. Under these conditions, or in panic stop situations, a driver will often apply excessive brake pressure, thus causing the wheels to lock such that excessive slippage between the wheels and the road surface takes place. Wheel lockup conditions can lead to loss of directional stability and, possibly, uncontrolled vehicle spinout.

In a continuing effort to improve the operational safety of vehicles, many companies have been involved in the development of anti-lock braking systems. While typically such systems are adapted to control the braking of each braked wheel of a vehicle, some systems have been developed for controlling the braking of only a portion of the braked wheels. Examples of prior art anti-lock brake systems are disclosed in U.S. Pat. Nos. 3,515,440; 3,731,979; 3,870,376; and 3,880,474 and are herein incorporated by reference.

Generally, prior art anti-lock brake systems include a central control unit for monitoring the speed of the controlled wheels to determine the deceleration of the controlled wheels. When the brakes of the vehicle are applied and the wheel deceleration of the monitored wheels exceeds a predetermined deceleration threshold, indicating that there is wheel slippage and the wheels are approaching a lockup condition, the central control unit functions to control the application of hydraulic pressure through a control valve means to the associated brakes to prevent lockup of the controlled wheels. Typically, the anti-lock brake system includes means for cyclically reducing and reapplying pressure to the associated brakes to limit wheel slippage to a safe level while continuing to produce adequate brake torque to decelerate the vehicle as desired by the driver. While some systems utilize a separate hydraulic pump as the means for reapplying pressure, other systems, such as disclosed in U.S. Pat. No. 4,418,966, do not require the use of a separate hydraulic pump. U.S. Pat. No. 4,418,966 is herein incorporated by reference.

In controlling the application of pressure to selected wheel brakes, many systems utilize a low pressure accumulator which is operative to temporarily receive and store brake fluid during pressure reduction phases of the anti-lock operation. The low pressure accumulator typically maintains fluid stored therein at a predetermined minimum pressure determined by a compression spring acting on an accumulator piston, generally in the range of 30–60 p.s.i. This minimum pressure represents the lowest pressure to which the controlled brakes can be reduced during anti-lock operation. However, it has been found that, in certain braking situations, it is necessary to reduce the controlled pressure below this minimum pressure in order to achieve the desired control. U.S. Pat. No. 4,976,501, incorporated herein by reference, describes an accumulator which maintains brake fluid stored therein at or near zero pressure. Thus, if necessary, fluid pressure to the controlled wheel brakes can be reduced to near zero pressure.

Referring now to FIG. 1, a pair of conventional low pressure accumulators are generally shown at 100. Each low pressure accumulator 102 includes a generally cup-shaped piston 104 slidably received within an axial bore 106 of a hydraulic control unit (HCU) 108 of a braking system. An end cap 110 is sealingly mounted at an open end of the bore 106. Typically, the end cap 110 includes an aperture for receiving an elastomeric boot 112. The elastomeric boot 112 is generally cup shaped and has a closed end and an open end. The open end includes an inwardly extending flange for attaching to a lip portion (not shown) formed about the aperture of the end cap 110. The boot 112 may include a passageway, such as a narrow slit, for the passage of air in the closed end thereof. In operation the elastomeric boot 112 allows a small volume of air to flow between the boot 112 and the end cap 110 as the piston moves from a top dead center to a bottom dead center position. The flow of air is further facilitated in boots 112 having a narrow slit in the closed end. The very small opening between the boot 112 and the end cap 10 further inhibits, but does not eliminate, the flow of water or contaminants into the accumulator. The boot 112 thereby allows for the passage of air as the piston 104 moves and provides an environmental seal which prevents water and contaminants from entering the accumulator 102.

Conventional braking system hydraulic control units are typically mounted to vehicle frame by a plurality of bolts. Elastomeric grommets are typically mounted between each bolt and the frame to absorb vibrations. Such conventional braking system hydraulic control units typically require three or more mounting bolts and associated elastomeric grommets, washers, and nuts.

SUMMARY OF THE INVENTION

The invention relates to a fluid accumulator, especially a low pressure fluid accumulator of a hydraulic control unit of a vehicle brake system. The accumulator body has an inner surface defining an axial bore extending from an open end to a closed end of the accumulator body. A generally cup-shaped cylindrical piston has an inner surface defining an axial bore and extends from an open end to a closed end of the piston, and is slidably received within the axial bore of the accumulator body. A cap has a generally cylindrical body portion and an inner surface defining an axial passageway therethrough. A circumferential, radially outwardly extending flange is formed on one end of the body portion of the cap. The cap is mounted in the bore of the accumulator body with the outer edge of the flange of the cap pressed into or otherwise fixed relative to the bore of the accumulator body and retains the piston therein. A spring is disposed between the cap and the piston and urges the piston relatively away from the cap and toward the closed end of the accumulator body. A grommet has a shaft and an enlarged annular head formed on a first end of the shaft. The shaft is disposed to seal against the inner surface of the cap. The grommet has an inner surface defining an axial bore extending from the head through an open end of the shaft at the first end of the shaft to a closed end of said shaft at a second end of the shaft, the closed end of said shaft having a closable passageway therethrough.

The low pressure accumulator of the invention provides an advantageous integration of the mounting of a braking system hydraulic control unit, and venting of a low pressure accumulator into one component. Assembly of a hydraulic control unit within a vehicle is simplified because, for example, one or more fasteners, such as a bolt and an associated grommet, washer, and nut, is eliminated. Further, the mechanical features of the grommet create a "dual-rate" effect that is more compliant for low amplitude vibration.

Various objects and advantages of this invention will become apparent to those skilled in the art from the following detailed description of the preferred embodiment, when read in light of the accompanying drawings.

DETAILED DESCRIPTION OF THE INVENTION

Figure 1:
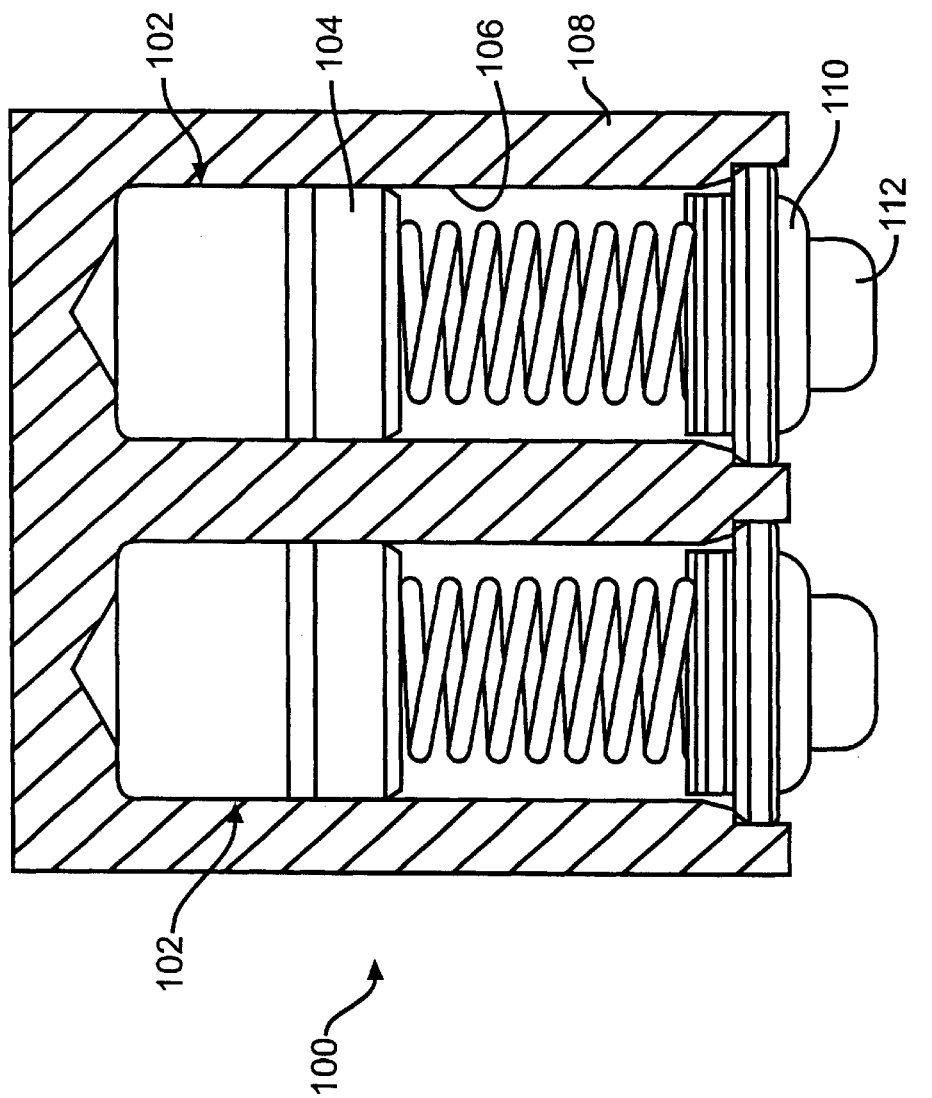
FIG. 1 is an elevational view, partially in cross section, of a pair of low pressure accumulators as known in the prior art including a rubber boot.
Figure 2:
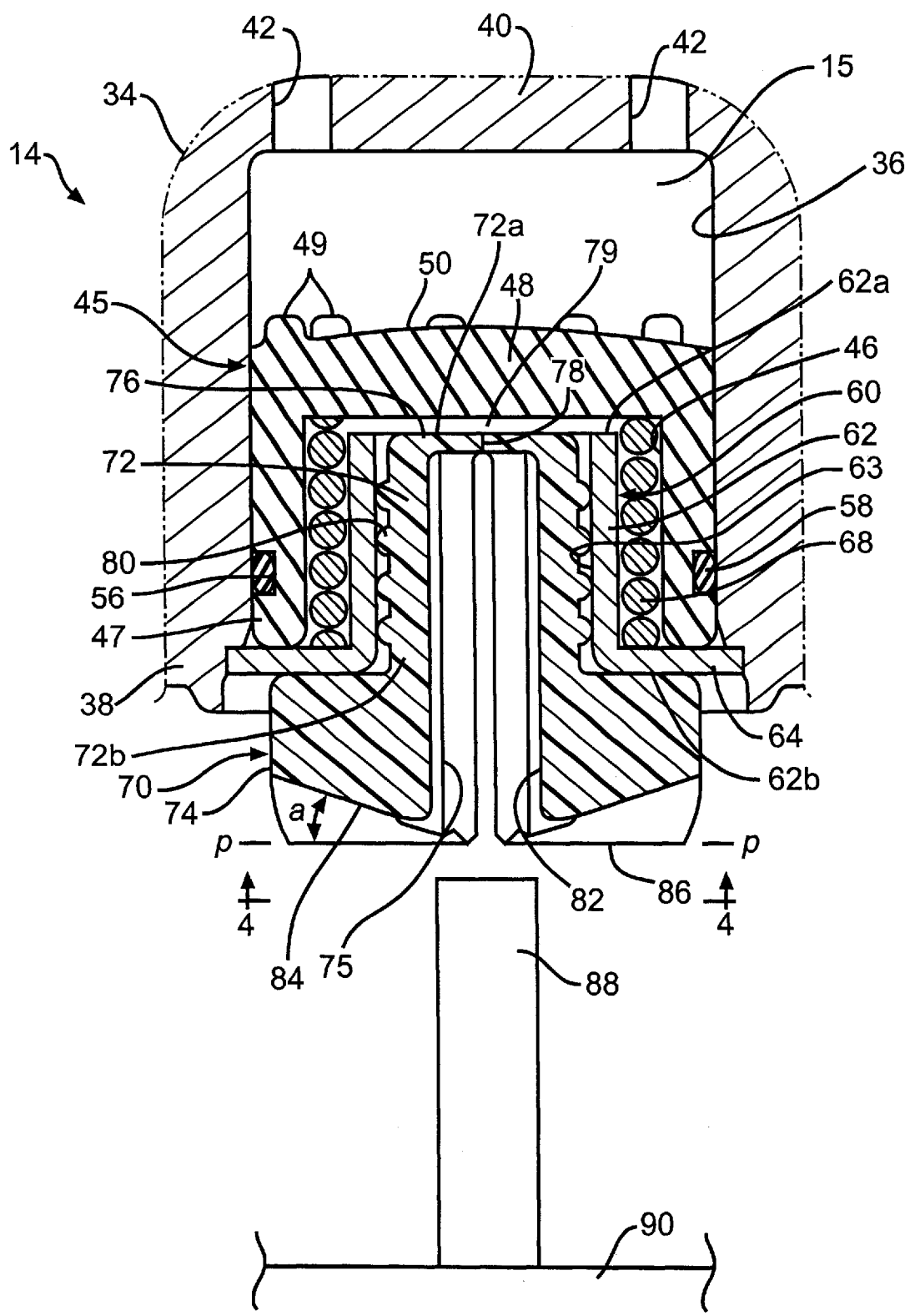
FIG. 2 is an elevational view in cross section of a low pressure accumulator in accordance with this invention with the components of the accumulator shown in position after the introduction of fluid into the accumulator reservoir.

Referring now to the drawings, there is illustrated in FIG. 2 a low pressure accumulator, generally shown at 14. The low pressure accumulator 14 includes a body 34. The body 34 typically forms a portion of a hydraulic control unit (HCU) of a brake system. The body 34 has an axial bore 36 extending from an open end 38 to a closed end 40. The closed end 40 of the bore 36 includes one or more apertures 42 for providing fluid communication between the bore 36 and the brake lines of the brake system in which the accumulator is installed.

A generally cup-shaped cylindrical piston 45 has an inner surface defining an axial bore 46 extending from an open end 47 to a closed end 48 of the piston 45. The piston 45 is slidably received within the axial bore 36 of the body 34. Preferably, a plurality of generally cylindrical bosses 49 extend axially from an outer surface 50 of the closed end 48. The piston 45 and the body 34 cooperate to define an accumulator reservoir 15. A circumferential groove 56 is formed in an outer surface of the piston 45. An O-ring 58 is disposed within the groove 56 for fluidly sealing between the piston 45 and the inner surface of the body 34 defining the axial bore 46.

A cap 60 has a generally cylindrical body portion 62. The body portion 62 is generally tubular having an inner surface defining an axial passageway 63 therethrough. The body portion 62 further has an inner end 62a (closest to the closed end 40 of the bore 36) and an outer end 62b. A circumferential, radially outwardly extending flange 64 is formed on the outer end 62b of the body portion 62. The cap 60 is mounted in the bore 36 of the accumulator body 34 to retain the piston 45 in the bore 36. Preferably the cap flange 64 is press fit within the open end 38 of the body 34, however any other suitable form of mounting may be used. A helical compression spring 68 is disposed between the cap flange 64 and the closed end 48 of the piston 45. The spring 68 urges the piston 45 relatively away from the cap flange 64 and toward the closed end 40 of the accumulator body 34.

Figure 3:
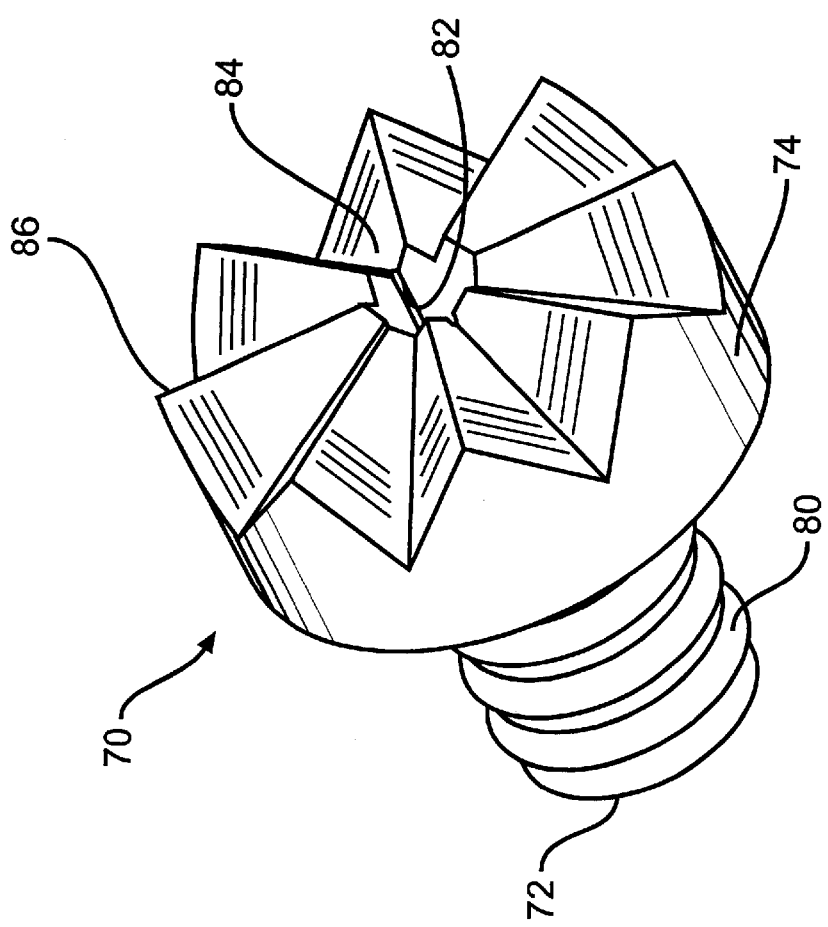
FIG. 3 is a perspective view of the grommet of FIG. 2.
Figure 4:
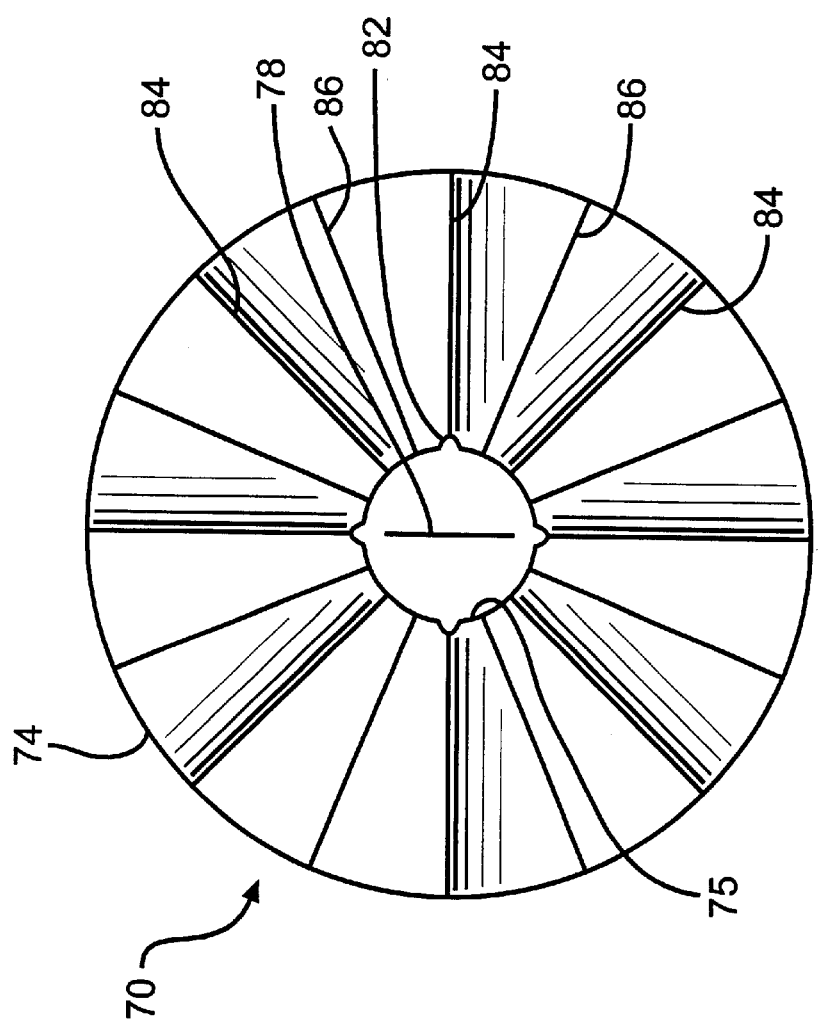
FIG. 4 is an end view of the grommet taken along line 4—4 of FIG. 2.

Referring now to FIGS. 2 through 4, a grommet 70 has a shaft 72 having an inner end 72a (adjacent the inner end 62a of the cap 60) and an outer end 72b. The grommet 70 may be formed of any suitable material, such as an elastomeric material. An enlarged annular head 74 is formed on the outer end 72b of the shaft 72. The grommet 70 includes an inner surface defining an axial bore 75 extending from an open end at the outer end 72b of the shaft 72 to a closed end 76 at the inner end 72a of the shaft 72. The closed end 76 of the shaft 72 has a passageway 78, such as, for example, a narrow slit, formed therethrough. The passageway 78 preferably is urged closed by the surrounding elastomeric material of the grommet 70. A plurality of spaced apart circumferential ribs 80 are formed on an outer surface of the shaft 72 of the grommet 70. The outer diameter of each rib 80 is slightly larger than the inner diameter of the axial passageway 63 of the cap 60. When inserted into the passageway 63, the ribs 80 compress radially inwardly and deform to provide a sealing engagement with the axial passageway 63 of the cap 60. A plurality of axial grooves 82 are formed within the axial bore 75 of the grommet 70. As illustrated in FIG. 2, the grooves 82 extend the entire length of the axial bore 75, however the grooves 82 may have a length shorter than the length of the bore 75, as will be explained in detail below. The narrow slit 78 provides fluid communication between the axial bore 75 and the enclosed volume 79 between the piston 48, the cap 60, and the grommet 70, to vent the volume 79 and thus allow the piston 48 to move freely.

The head 74 of the grommet 70 has a diameter larger than the diameter of the shaft 72. The head 74 has a crown cut geometry providing radially extending V-shaped grooves 84 within an axial face of the head 74. The V-shaped grooves 84 are equiangular spaced and extend from an opening of the axial bore 75 of the grommet 70. The base of each groove. 84 extends radially outwardly and at an angle a away from the plane p of the axial face of the head 74 (e.g., the plane perpendicular to a longitudinal axis of the axial bore 75 of the grommet). However, it will be appreciated that satisfactory results may be achieved by grooves having other shapes, such as grooves with a square or arcuate cross-section. Similarly, satisfactory results may be achieved by a grommet 70 wherein the base of each groove extends radially outwardly and at an angle toward the plane of the axial face of the head 74 or wherein the base of each groove is parallel with the plane of the axial face of the head 74. Each groove 84 is defined by a pair of equiangular spaced ridges 86 on either side thereof. The grooves 84 provide radial fluid communication between the atmosphere and the axial bore 75 of the grommet 70.

The axial bore 75 is adapted for mounting on a pin 88. Preferably, the pin 88 is a steel pin attached to a vehicle chassis 90. The pin 88 is preferably mounted within the bore 75 of the grommet 70 in a line to line fit, however any other suitable mounting method may be used, such as an interference fit.

The piston 45 is normally biased upwardly (as viewed in FIG. 2) by the compression spring 68 toward the closed end 40 of the accumulator body 34. In this position, the piston 45 and the body 34 cooperate to define an accumulator reservoir 15 at minimum volume. In accordance with the present invention, when the brake system enters the anti-lock mode and fluid is dumped into the accumulator reservoir 15, the piston 45 is shifted downwardly (as viewed in FIG. 2) and compresses the spring 68. During non-braking conditions, the spring 68 urges the piston 45 upwardly (as viewed in FIG. 2) such that the bosses 49 on the surface 50 of the piston 45 are seated against the closed end 40 of the accumulator body 35 to maintain the accumulator reservoir 15 at minimum volume.

An important aspect of the invention is the configuration of the grommet 70. The grommet 70 is adapted to be mounted in the low pressure accumulator 14 of a typical ABS brake system and particularly may be mounted in an HCU arrangement. The HCU (not shown) is provided with a plurality of internal openings and passageways formed therein for receiving and interconnecting various components of the ABS, such as, for example, a dump valve, and one or more low pressure accumulator 14.

The HCU is typically attached to a vehicle frame by a plurality of bolts, such as, for example three bolts. Each bolt typically includes a rubber grommet attached thereto and disposed between the HCU and the vehicle frame to dampen vibrations. Also associated with each bolt are associated washers and nuts. The specific construction of the grommet 70 allows the low pressure accumulator 14 to be used as a mounting point to mount the HCU to the vehicle frame. Specifically, the pin 88 is preferably a portion of a mounting bracket and suitably attached to the vehicle chassis 90. The HCU may therefore be attached to the vehicle chassis 90 by inserting the pin 88 into the bore 75 of the grommet 70. The ridges 86 of the grommet 70 are disposed against the mounting bracket or the vehicle chassis 90. More specifically, the HCU may be slipped onto the pin 90 (or pins 90) associated with each of the low pressure accumulators 14 of the HCU that is provided with an associated grommet 70 to limit movement in two axes. The HCU is prevented from slipping back off of the pin(s) 88 (the third axis of movement) by the use of one or more conventional bolt/nut and grommet arrangement. The use of the low pressure accumulator 14 and its associated grommet 70 as a mounting point thereby reduces the number of mounting bolts and associated rubber grommets, nuts and washers required to mount the HCU to the vehicle chassis 90 and speeds the time required to mount the HCU.

The novel shape of the grommet 70 also facilitates improved passage of air as the piston 45 moves, and provides-an improved environmental seal which prevents water and contaminates from entering the accumulator 14. As the piston 45 moves toward the closed end 40 of the body 34, air is drawn into a cavity between the closed end 76 of the grommet 45 and the closed end 48 of the piston 45. Specifically, air flows between the grommet 70 and the chassis 90, through the grooves 84, through the axial grooves 82 and through the passageway 78. Conversely, as the piston 45 moves away from the closed end 40 of the body 34 and toward the closed end 76 of the grommet 45, air flows back through the narrow slit 78, through the axial grooves 82 and though the grooves 84. Note that the pin 88 has a length shorter than the length of the bore 75 of the grommet 70 and shorter than the length of the axial grooves 82, such that air may flow through the grooves 82 from the V-shaped grooves 84 to the slit 78.

As indicated above, the novel shape of the grommet 70 provides an improved environmental seal by providing a circuitous path for water and contaminates to flow. Further, the narrow slit 78 is normally closed. Any water or contaminate that may flow through the circuitous path formed by the V-shaped grooves 84 and the axial grooves 82 is prevented from flowing through the normally closed narrow slit 78, thus providing an improved environmental seal.

The plurality of narrow ridges 86 provide a reduced contact surface between the grommet 70 and the vehicle chassis 90. The crown-shaped geometry creates a "dual rate" effect that is more compliant for low amplitude vibration. That is, the reduced contact surface allows the grommet 70 to efficiently absorb energy generated by high frequency, low amplitude vibration typically generated by the brake system 10 and prevents the transfer of the energy to the vehicle chassis 90. Additionally, the reduced contact surface allows the grommet 70 to absorb the energy typically generated by the vibration of the vehicle during travel on a road surface and prevents the transfer of road vibration through the chassis 90 to the brake system 10.

The accumulator assembly of the present invention has been explained and illustrated in its preferred embodiment. However, it will be appreciated that various modifications may be made to the accumulator assembly without departing from the spirit of the present invention. For example, while the preferred embodiment of the invention utilizes axial grooves 82 within the bore 75 of the grommet 70 for the passage air, other means could be used. For example, grooves could be formed on an outer surface of the mounting pin 88.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A fluid accumulator comprising:
    an accumulator body having an inner surface defining an axial bore extending from an open end of said accumulator body to a closed end of said accumulator body;
    a generally cup-shaped cylindrical piston having an inner surface defining an axial bore extending from an open end of said piston to a closed end of said piston, said piston being slidably received within said axial bore of said accumulator body;
    a cap having a generally cylindrical body portion having an inner surface defining an axial passageway through said body portion, said cap further having a circumferential, radially outwardly extending flange formed on one end of said body portion, said cap being mounted in said bore of said accumulator body to retain said piston in said bore of said accumulator body;
    a spring disposed between said cap and said piston, said spring urging said piston relatively away from said cap and toward said closed end of said accumulator body; and
    a grommet having a shaft and an enlarged annular head formed on a first end of said shaft, said shaft being disposed to seal against said inner surface of said cap, said grommet having an inner surface defining an axial bore extending from said head through an open end of said shaft at said first end of said shaft to a closed end of said shaft at a second end of said shaft, said closed end of said shaft having a closable passageway therethrough.

2. The fluid accumulator according to claim 1, said accumulator body forming a portion a hydraulic control unit (HCU) of a brake system.

3. The fluid accumulator according to claim 1, said closed end of said body further including a plurality of apertures therethrough.

4. The fluid accumulator according to claim 1 wherein said piston includes a plurality of bosses extending axially from an outer surface of said closed end of said piston, and a circumferential groove formed in an outer surface of said piston.

5. The fluid accumulator according to claim 4 further including an O-ring disposed in said circumferential groove of said piston for fluidly sealing said piston and said body.

6. The fluid accumulator according to claim 1 wherein said spring is a helical coil spring.

7. The fluid accumulator according to claim 1 wherein an outer surface of said shaft of said grommet includes a plurality of circumferential ribs for sealing engagement with said axial passageway of said cap.

8. The fluid accumulator according to claim 7 including a plurality of axial grooves formed in said inner surface of said grommet.

9. The fluid accumulator according to claim 8 wherein said closable passageway formed in said closed end of said shaft of said grommet comprises a narrow slit, said slit providing fluid communication between said axial grooves of said grommet and said axial bore of said piston.

10. The fluid accumulator according to claim 9, wherein said annular head includes an annular side surface and an end surface, said end surface having a plurality of equiangular spaced V-shaped grooves extending radially from said axial bore of said grommet, the base of each groove extending at an angle from a plane defining said end surface of said head, adjacent ones of said grooves defining radially extending ridges therebetween, said V-shaped grooves fluidly communicating with said axial grooves of said grommet.

11. The fluid accumulator according to claim 1 further including a pin having a length less than the length of said axial bore of said grommet, the length of said pin further being less than the length of said axial grooves of said grommet, said pin being mounted within said axial bore of said grommet.

12. The fluid accumulator according to claim 11 including an axially extending groove formed in at least one of said inner surface of said grommet and an outer surface of said pin.

13. A grommet for a fluid accumulator, comprising:
a hollow generally cylindrical shaft having a closed end and an open end, said closed end of said shaft having an opening therethrough; and
an enlarged annular head formed-on said open end of said shaft, said annular head having an inner surface defining an axial bore therethrough, said axial bore being in fluid communication with said hollow shaft, said annular head further having a crown cut geometry providing radially extending grooves within an axial face of said annular head, said radially extending grooves being in fluid communication with said axial bore of said annular head.

14. The grommet according to claim 13 wherein said inner surface of said hollow shaft includes a plurality of axial grooves formed therein, said axial grooves providing fluid communication between said radially extending grooves of said head and said opening in said closed end of said shaft.

15. The grommet according to claim 13 further including a plurality of circumferential ribs formed on an outer surface of said shaft.

16. The grommet according to claim 13 wherein said opening through said closed end of said shaft is self-closing.

17. A hydraulic control unit (HCU) for a vehicle brake system comprising:
an HCU body;
an accumulator mounted in said HCU body; and
a mount for mounting said HCU body to a vehicle body, said mount including a grommet for resiliently separating said HCU body from said vehicle body, said grommet defining a vent path for said accumulator.

18. The hydraulic control unit according to claim 17 wherein said grommet includes a hollow generally cylindrical shaft having a closed end and an open end, said closed end of said shaft having an opening therethrough, and an enlarged annular head formed on said open end of said shaft, said annular head having an inner surface defining an axial bore therethrough, said axial bore being in fluid communication with said hollow shaft, said annular head further having a crown cut geometry providing radially extending grooves within an axial face of said annular head, said radially extending grooves being in fluid communication with said axial bore of said annular head.

* * * * *

UNITED STATES PATENT AND TRADEMARK OFFICE
CERTIFICATE OF CORRECTION

PATENT NO. : 6,634,386 B1
DATED : October 21, 2003
INVENTOR(S) : Brian Maloney et al.

It is certified that error appears in the above-identified patent and that said Letters Patent is hereby corrected as shown below:

<u>Column 7,</u>
Line 28, delete "formed-on" and insert -- formed on --.

Signed and Sealed this

Third Day of February, 2004

JON W. DUDAS
*Acting Director of the United States Patent and Trademark Office*